United States Patent Office 3,787,464
Patented Jan. 22, 1974

3,787,464
PROCESS FOR THE PREPARATION OF
TRIVALENT COBALT COMPLEXES
Carlo Neri and Emilio Perrotti, San Donato, Milanese,
Italy, assignors to Snam Progetti S.p.A., Milan, Italy
No Drawing. Filed Dec. 30, 1970, Ser. No. 102,975
Claims priority, application Italy, Dec. 30, 1969,
26,425/69
Int. Cl. C07c *11/26*
U.S. Cl. 260—439 R                5 Claims

ABSTRACT OF THE DISCLOSURE

A process is disclosed for preparing trivalent cobalt derivatives of the formula

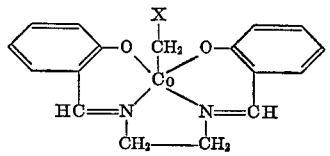

wherein X is $NO_2$, CN, $CH_3CO$ or CHO which comprises reacting a suspension or solution containing a divalent cobalt complex of the formula

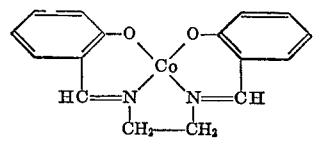

methanol and a reactant of the formula $CH_3-X$ wherein, X is as defined above, at a temperature from 0° C. to 80° C. while simultaneously introducing oxygen gas into said suspension or solution.

---

In copending application U.S. Ser. No. 102,977, filed Dec. 30, 1970, and entitled Oxidation Products of Cobalt Complexes, Process for obtaining Same and Insertion Process, a process is described for obtaining compounds having the formula:

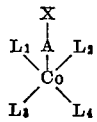

wherein $L_1$, $L_2$, $L_3$ and $L_4$ may belong to the same ligand molecule, for example a planar tetradentate ligand as bis-(diacetylmonoximeimino) - propane, bis - (salicyl-aldehyde)-ethylenediamine, or bis-(acetylacetone)-ethylenediamine, or may belong to two molecules of a bidentate ligand which may be selected from o-phenanthroline, 2-2′ dipyridyl, nitroketones, acetylacetone, o-nitrosophenyl, bidentate Schiff bases of the formula

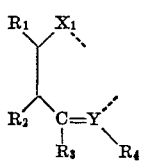

wherein $R_1$, $R_2$, $R_3$ and $R_4$ may be hydrogen, or substituted and unsubstituted alkyl or aryl radicals, $X_1$ may be oxygen, sulphur or nitrogen, Y is nitrogen; or they may be four monodentate ligands, the same or different, as nitriles, amines, phosphines, tioalcohols, nitrocompounds, halogen ions and so on; A is a divalent radical as

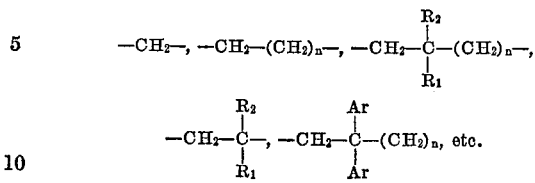

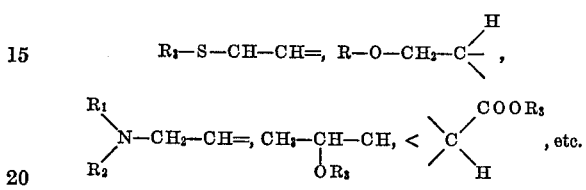

or a substituted radical as

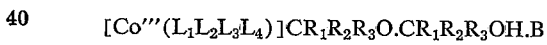

and X is a functional group such as $NO_2$, —CN, $CH_3CO$, —CHO, etc. The above compounds were obtained by means of two stage reactions. In the first stage an oxidation reaction was carried out on divalent cobalt complexes having the formula

which reaction is produced either trivalent cobalt dinuclear compounds as $$[Co'''(L_1L_2L_3L_4)]_2CR_1R_2O.2B$$

wherein B is an alcohol, ether or water, or mononuclear compounds as $$[Co'''(L_1L_2L_3L_4)]CR_1R_2R_3O.CR_1R_2R_3OH.B$$

wherein B is pyridine, quinoline or a base selected from aliphatic, heterocyclic or aromatic bases, and $L_1$, $L_2$, $L_3$, $L_4$, $R_1$, $R_2$ and $R_3$ are as defined above.

In the second stage the above trivalent cobalt compounds were allowed to react with the following compounds

HA—X wherein A and X have the aforesaid meanings, which reaction gave rise to substantially quantitative yields of crystalline derivatives.

It has now been found, and is the object of the present invention, that it is possible to obtain the same trivalent cobalt compounds by starting from the divalent cobalt complexes:

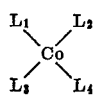

without isolating the oxidation intermediates.

More particularly, a novel process has been found for preparing trivalent cobalt derivatives of the formula

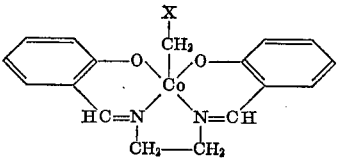

wherein X is $NO_2$, $CN$, $CH_3CO$ or $CHO$ which comprises reacting a suspension or solution containing a divalent cobalt complex of the formula

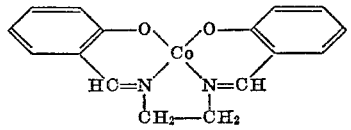

methanol and a reactant of the formula $CH_3$—X, wherein X is as defined above, at a temperature from 0° C. to 80° C. while simultaneously introducing oxygen gas into said suspension or solution.

The synthesis of the above compounds can be carried out in homogeneous phase or in heterogeneous phase in the presence of a mixture of alcohol and reactant at various stoichiometric ratios.

More particularly the oxidation of the divalent cobalt complexes is carried out by allowing oxygen to bubble into a suspension or a solution of said complexes in a mixture of alcohol and reactant. The alcohol may be selected from methyl-alcohol, ethylene chlorohydrin, ethylene glycol, benzyl alcohol, allyl alcohol, etc. Typical unrestrictive examples of reactants, according to the present invention, are acetone, nitromethane, acetaldehyde, acetonitrile and the like.

The reaction may be carried out at a temperature in the range 0° C. to 80° C.

Preferably, it is carried out by slightly heating in order to increase the reaction rate. The final products are substantially quantitatively isolated as crystalline derivatives.

EXAMPLE 1

At room temperature 4 g. of Co''-Salen [bis (salicylaldehyde) ethylenediiminate] were suspended into a mixture consisting of 25 ml. of nitromethane and 25 ml. of methyl alcohol.

Oxygen was allowed to bubble into the suspension for about two hours, heated for a few minutes at 50–60° C. then the suspension was cooled to room temperature.

The solid compound was filtered, washed by ether and dried under vacuum. A crystalline derivative was obtained at a yield higher than 90%.

EXAMPLES 2–4

By working at the same conditions of the preceding example, 4 g. of the Co-Salen complex were suspended into a mixture consisting of methyl alcohol and, respectively, of acetone, acetonitrile and acetaldehyde. Crystalline solid compounds were always obtained at a yield higher than 90%.

What we claim is:

1. A process for the preparation of tetradentate complexes of trivalent cobalt of the formula:

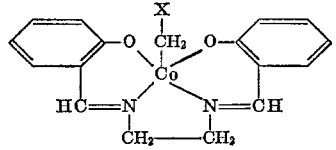

wherein X is $NO_2$ $CN$, $CH_3CO$ or $CHO$ which comprises reacting a suspension or solution containing a divalent cobalt complex of the formula

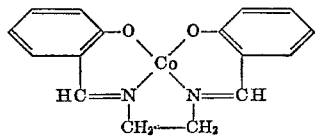

methanol and a reactant of the formula $CH_3$—X, wherein X is as defined above, at a temperature from 0° C. to 80° C. while simultaneously introducing oxygen gas into said suspension or solution.

2. A process according to claim 1 in which the $CH_3$—X reactant is acetone.

3. A process according to claim 1 in which the $CH_3$—X reactant is nitromethane.

4. A process according to claim 1 in which the $CH_3$—X reactant is acetonitrile.

5. A process according to claim 1 in which the $CH_3$—X reactant is acetaldehyde.

References Cited
UNITED STATES PATENTS

| | | | |
|---|---|---|---|
| 3,562,307 | 2/1971 | Costa et al. | 260—439 R |
| 3,562,308 | 2/1971 | Costa et al. | 260—439 R |
| 3,584,021 | 6/1971 | Costa et al. | 260—439 R |
| 3,584,022 | 6/1971 | Costa et al. | 260—439 R |
| 3,590,062 | 6/1971 | Costa et al. | 260—439 R |

DANIEL E. WYMAN, Primary Examiner

A. P. DEMERS, Assistant Examiner

U.S. Cl. X.R.

260—429 J